United States Patent Office 3,663,573
Patented May 16, 1972

3,663,573
EPOXIDES DERIVED FROM SUBSTITUTED
ACRYLAMIDES
Lester Earl Coleman, Willoughby Hills, Ohio, assignor to
The Lubrizol Corporation, Wickliffe, Ohio
No Drawing. Filed Mar. 27, 1970, Ser. No. 23,498
Int. Cl. C07d 1/20
U.S. Cl. 260—348 A     5 Claims

ABSTRACT OF THE DISCLOSURE

Epoxides are prepared from N-3-oxohydrocarbon-substituted and N-3-hydroxyalkyl acrylamides, especially diacetone acrylamide, by reaction with a hypohalous acid followed by treatment with alkali or by reaction with a carboxylic peracid. These epoxides are useful as diluents for epoxy resins.

This invention relates to new compositions of matter and methods of preparing them, and more particularly to compounds of the formula $$R^1-Z-\underset{\underset{R^3}{|}}{\overset{\overset{R^2}{|}}{C}}-\underset{\underset{R^5}{|}}{\overset{\overset{R^4}{|}}{C}}-\underset{\underset{H}{|}}{N}-\overset{\overset{O}{\|}}{C}-\underset{\underset{R^6}{|}}{C}\overset{O}{\diagdown}CH_2$$

wherein:

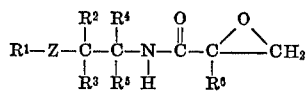

Z is $-\overset{O}{\overset{\|}{C}}-$ or $-\overset{OH}{\overset{|}{C}H}-$ each of $R^1$, $R^2$, $R^3$, $R^4$ and $R^5$ is hydrogen or a hydrocarbon radical; and
$R^6$ is hydrogen or a lower alkyl radical.

As used herein, the term "hydrocarbon radical" includes aliphatic, cycloaliphatic and aromatic (including aliphatic-substituted aromatic and aromatic-substituted aliphatic) radicals. Substituted hydrocarbon, alkyl, aryl, etc., radicals are considered to be fully equivalent to the hydrocarbon, alkyl, aryl, etc., radicals and to be part of this invention. By "substituted" is particularly meant radicals containing relatively inert substituents such as ether (especially lower alkoxy), ester (especially lower carbalkoxy), keto, nitro, halogen and the like so long as these substituents do not alter significantly the character or reactivity of the radical. In general, no more than about three such substituent groups will be present for each 10 carbon atoms in the radical.

The following are illustrative of hydrocarbon and substituted hydrocarbon radicals within the scope of this invention:

—CH₃
—CH₂CH₃
—CH₂CH₂CH₃

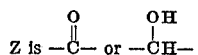

—(CH₂)₆CHCH₂CH₃
           |
          CH₃

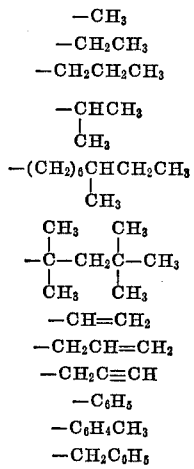

—CH=CH₂
—CH₂CH=CH₂
—CH₂C≡CH
—C₆H₅
—C₆H₄CH₃
—CH₂C₆H₅

—C₆H₃(C₂H₅)₂
—C₆H₄(CH₂)₁₁CH₃

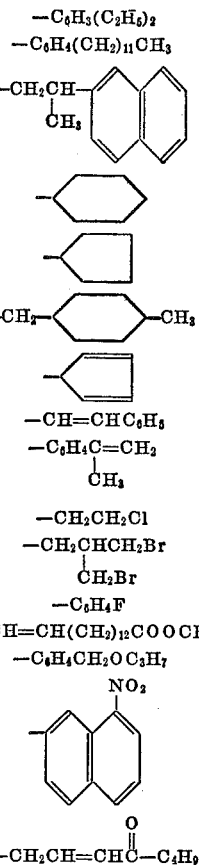

—CH=CHC₆H₅
—C₆H₄C=CH₂
       |
      CH₃

—CH₂CH₂Cl
—CH₂CHCH₂Br
       |
      CH₂Br
—C₆H₄F
—CH=CH(CH₂)₁₂COOCH₃
—C₆H₄CH₂OC₃H₇

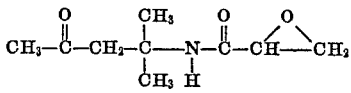

Preferably, the hydrocarbon or substituted hydrocarbon radicals in the compounds of this invention are lower hydrocarbon radicals, the word "lower" denoting radicals containing no more than about 12 carbon atoms. Still more preferably, they are lower alkyl or aryl radicals, most often alkyl. In the most preferred embodiments of the invention, $R^1$, $R^4$ and $R^5$ are lower alkyl radicals; $R^2$ and $R^3$ are hydrogen; and $R^6$ is hydrogen or methyl.

The following are illustrative of the compounds of this invention.

N-(1,1-dimethyl-3-oxobutyl)-2,3-epoxypropionamide

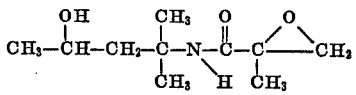

N-(1,1-dimethyl-3-hydroxybutyl)-2-methyl-2,3-epoxypropionamide

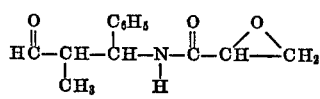

N-(-phenyl-2-methyl-3-oxopropyl)-2,3-epoxypropionamide

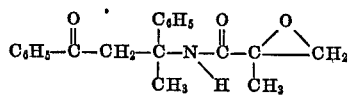

N-(1,3-diphenyl-1-methyl-3-oxopropyl)-2-methyl-2,3-epoxypropionamide $$C_6H_5-\overset{O}{\overset{\|}{C}}-CH_2-\underset{\underset{CH_3}{|}}{\overset{\overset{C_6H_5}{|}}{C}}-\underset{\underset{H}{|}}{N}-\overset{\overset{O}{\|}}{C}-\underset{\underset{CH_3}{|}}{C}\overset{O}{\diagdown}CH_2$$

N-[1-methyl-2-(p-nitrophenyl)-3-hydroxybutyl]-2,3-epoxypropionamide

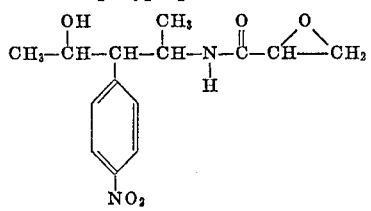

N-[1-methyl-1-(3-chlorocyclopentyl)-3-hydroxybutyl]-2,3-epoxypropionamide

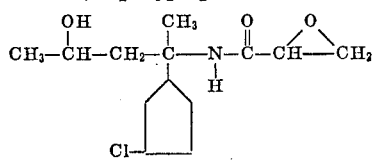

N-(2-ethyl-4-phenyl-3-oxobutyl)-2-ethyl-2,3-epoxypropionamide

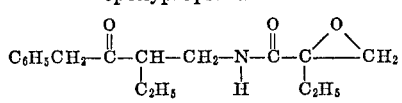

The compounds of this invention may be prepared from N-3-oxohydrocarbon-substituted acrylamides or N-3-hydroxyalkyl acrylamides by the following series of reactions:

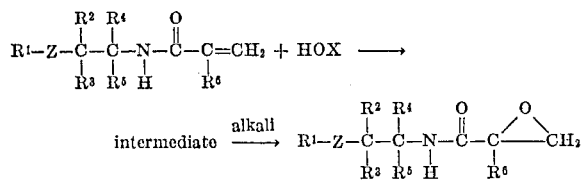

wherein X is a halogen, preferably chlorine or bromine and usually chlorine. The preferred starting materials in this series are N-(1,1-dimethyl-3-oxobutyl)acrylamide, hereinafter called diacetone acrylamide; N-(1,1-dimethyl-3-oxobutyl)methacrylamide, hereinafter called diacetone methacrylamide; N-(1,3-diphenyl-1-methyl-3-oxopropyl)acrylamide, hereinafter called diacetophenone acrylamide; and N-(1,1-dimethyl-3-hydroxybutyl)acrylamide and methacrylamide. The preparation of the first three of these N-substituted acrylamides is described in U.S. Pats. 3,277,056 and 3,425,942, and the preparation of the last two is described in copending application Ser. No. 788,819, filed Jan. 3, 1969. The disclosures of these patents and this application are incorporated by reference herein.

Since diacetone acrylamide is the most inexpensive and readily available of the N-3-oxohydrocarbon-substituted acrylamides, frequent reference will be made to this compound herinafter as representative of the genus. It is to be understood, however, that other compounds of the genus may be substituted for diacetone acrylamide.

In the first step of the above-mentioned series of reactions for the preparation of the compounds of this invention, diacetone acrylamide is reacted with a hypohalous acid, usually hypochlorous acid. This reaction normally takes place in aqueous solution and is conveniently effected by dissolving diacetone acrylamide in water, saturating the solution wtih chlorine and then adding an alkali, such as sodium hydroxide, sodium carbonate, sodium bicarbonate, potassium hydroxide, potassium carbonate or the like. Enough alkaline reagent is added to make the solution basic, and the reaction is allowed to continue (usually for a period between about 15 minutes and 2 hours) at a temperature of about 0–50° C. The time and temperature are not critical but may be adjusted to facilitate the desired reaction. The intermediate formed during this reaction is believed to be a halohydrin, but the invention is not dependent upon its structure.

The intermediate may be isolated by ordinary techniques, such as extraction with an organic solvent and removal of the solvent by distillation, evaporation or the like, or it may be utilized in the aqueous solution in which it was prepared. Usually, it is convenient to isolate the intermediate by extraction but not to purify it— rather, merely to evaporate the crude extract and use it directly in the second reaction of the series.

In the second step, the intermediate is reacted with alkali, usually in the presence of water and ordinarily at a temperature of about 10–50° C. The amount of alkali used is generally slightly in molar excess of the amount of intermediate and may be as high as twice or three times the amount of intermediate. Usually, the reaction is complete within one-half hour to two hours. The resulting epoxide, which is the compound of this invention, may be isolated and purified by well-known techniques.

Another method for the preparation of the compounds of this invention is by the reaction of diacetone acrylamide or one of its analogous compounds with a carboxylic peracid, such as peracetic acid, trifluoroperacetic acid, perbenzoic acid or the like.

The preparation of the compounds of this invention is illustrated by the following examples.

EXAMPLE 1

A solution of 225 parts of (1.33 moles) of diacetone acrylamide in 675 parts of distilled water is cooled to 10° C., and chlorine is bubbled in at 8–15° C. for 2½ hours, until chlorine absorption ceases. Sodium hydroxide (50% aqueous solution), 120 parts (1.5 moles), is then added slowly at 10–17° C., with stirring; when it has all been added, the mixture is basic. It is stirred for one half hour at 10–12° C. and is then extracted with chloroform. The chloroform extract is dried over magnesium sulfate and filtered, and the chloroform is removed by vacuum distillation. The residue is distilled and the desired intermediate is obtained boiling at 103–130° C./0.15–0.25 mm. This fraction is redistilled and the intermediate is collected at 121–125° C./0.1–0.2 mm.

A portion of the intermediate (44.3 parts, or 0.20 mole assuming the intermediate is a chlorohydrin) is mixed with 100 parts of water and 20 parts of 50% aqueous sodium hydroxide (0.24 mole) is added slowly. The temperature rises to 30° C. and is maintained there for one hour, with stirring, and the mixture is then extracted with chloroform. The chloroform extract is dried over magnesium sulfate, filtered and stripped of chloroform by vacuum distillation. The desired N - (1,1-dimethyl-3-oxobutyl)-2,3-epoxypropionamide is obtained boiling at 70–72° C./0.1 mm. The compound contains 7.48% nitrogen and 8.20% oxirane oxygen, as compared with theoretical values of 7.57% and 8.65%, respectively.

EXAMPLE 2

Chlorine is bubbled into a solution of 845 parts (5 moles) of diacetoneacrylamide in 2535 parts of water, at 8–14° C., for 3½ hours. The mixture is stirred for one half hour at 10–14° C., and then 425 parts (5.06 moles) of sodium bicarbonate is added resulting in neutralization of the solution. The intermediate is extracted from the solution with chloroform and dried over magnesium sulfate. The chloroform extract is filtered and the chloroform is removed by vacuum evaporation; the residue is extracted with water. To the aqueous extract is added 325 parts of 50% aqueous sulfuric acid, and the mixture thus obtained is stirred for one hour at 30–33° C. and extracted with chloroform. The chloroform extracts are dried over magnesium sulfate and filtered, and the chloroform is removed by vacuum evaporation. Upon vacuum distillation of the residue, the desired N-(1,1-dimethyl-3-oxobutyl)-2,3-epoxypropionamide is obtained.

EXAMPLE 3

The procedure of Example 2 is repeated, except that the diacetone acrylamide is replaced by an equimolar amount of diacetone methacrylamide. The product is the desired N-(1,1-dimethyl-3-oxobutyl)-2-methyl-2,3-epoxypropionamide.

EXAMPLE 4

The procedure of Example 2 is repeated, except that the diacetone acrylamide is replaced by an equimolar amount of diacetophenone acrylamide. The product is the desired N-(1-methyl 1,3-diphenyl-3-oxopropyl)-2,3-epoxypropionamide.

EXAMPLE 5

The procedure of Example 2 is repeated, except that the diacetone acrylamide is replaced by an equimolar amount of N-(1,1-dimethyl-3-hydroxybutyl)acrylamide. The product is the desired N-(1,1-dimethyl-3-hydroxybutyl)-2,3-epoxypropionamide.

EXAMPLE 6

The procedure of Example 2 is repeated, except that the diacetone acrylamide is replaced by an equimolar amount of N-(1,1-dimethyl-3-hydroxybutyl)methacrylamide. The product is the desired N-(1,1-dimethyl-3-hydroxybutyl)-2-methyl-2,3-epoxypropionamide.

The compounds of this invention are useful for the preparation of the substituted oxyethylene polymers, by normal polymerization methods utilized with epoxides. They may also be used as chain transfer agents for the regulation of the molecular weight of oxypropylene or oxyethylene polymers, to obtain useful surface active agents. They also undergo other typical epoxide reactions.

The compounds of this invention are also useful as diluents for epoxy resins, reducing the viscosity of such resins when incorporated therein in very low concentrations. This is shown by an experiment in which a commercial epoxy resin prepared from bisphenol A and epichlorohydrin and having an epoxide equivalent weight of 175–195 is diluted with various amounts of N-(1,1-dimethyl-3-oxobutyl)-2,3-epoxypropionamide. The table lists Brookfield viscosity (2 r.p.m., 77° F.) and various physical properties determined on a ⅛-inch thick casting prepared between cellophane coated glass plates from the resin cured with 10 phr. of diethylenetriamine, and aged for two weeks. The results are given in the following table.

| Diluent concentration, phr. | Brookfield viscosity, cp. | Tensile strength, p.s.i. | Flexural strength, p.s.i. | Flexural modulus, p.s.i. | Izod impact strength, ft.-lb./in. |
|---|---|---|---|---|---|
| 0 | 18,400 | 11,700 | 19,700 | 5.10×10⁵ | 0.47 |
| 1.0 | 12,800 | | | | |
| 2.5 | 10,600 | | | | |
| 5.0 | 8,600 | | | | |
| 7.5 | 6,800 | | | | |
| 10.0 | 6,000 | 10,700 | 16,100 | 5.66×10⁵ | 0.30 |

What is claimed is:
1. A compound of the formula

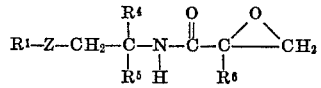

wherein:

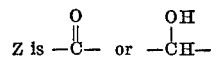

each of $R^1$, $R^4$ and $R^5$ is hydrogen, alkyl having no more than about 12 carbon atoms, or phenyl; and $R^6$ is hydrogen or methyl.

2. A compound according to claim 1 wherein each of $R^1$, $R^4$, and $R^5$ is alkyl.

3. A compound according to claim 2 wherein Z is

4. A compound according to claim 3 wherein $R^1$, $R^4$ and $R^5$ are methyl.

5. A compound according to claim 4 wherein $R^6$ is hydrogen.

References Cited

Weissberger, A.: Heterocyclic Compounds with Three- and Four-Membered Rings, Part One (1964), pp. 95, 96, 100.

NORMA S. MILESTONE, Primary Examiner

U.S. Cl. X.R.

260—561 N, 2 A, 30.4 EP, 47 EN